United States Patent

Mizuta

[11] Patent Number: 5,629,823
[45] Date of Patent: May 13, 1997

[54] MAGNETIC DISK CARTRIDGE

[75] Inventor: Akira Mizuta, Kanagawa-ken, Japan

[73] Assignee: Fuji Photo Film Co., Ltd., Kanagawa, Japan

[21] Appl. No.: 609,906

[22] Filed: Feb. 29, 1996

[30] Foreign Application Priority Data

Mar. 3, 1995 [JP] Japan .................. 7-044068

[51] Int. Cl.$^6$ .................. G11B 23/03; F16B 4/00
[52] U.S. Cl. .................. 360/133; 369/291; 403/277; 403/297
[58] Field of Search .................. 360/133, 132; 369/291; 206/308.1; 403/277, 282, 345, 371, 361, 408.1, 297

[56] References Cited

U.S. PATENT DOCUMENTS

| | | | |
|---|---|---|---|
| 4,089,612 | 5/1978 | Mazzeo .................. | 403/361 |
| 4,371,131 | 2/1983 | Okamura et al. .................. | 242/346 |
| 4,384,803 | 5/1983 | Cachia .................. | 403/345 |
| 4,564,878 | 1/1986 | Weavers et al. .................. | 360/132 |
| 4,573,572 | 3/1986 | Kato et al. .................. | 206/303 |
| 5,075,810 | 12/1991 | Iwahashi .................. | 360/132 |
| 5,121,279 | 6/1992 | Saeki et al. .................. | 360/133 |
| 5,212,614 | 5/1993 | Hughes et al. .................. | 360/133 |
| 5,289,457 | 2/1994 | Akiyama .................. | 369/291 |
| 5,325,257 | 6/1994 | Akiyama et al. .................. | 360/133 |
| 5,362,172 | 11/1994 | Hubbling .................. | 403/282 |

*Primary Examiner*—Stuart S. Levy
*Assistant Examiner*—Paul J. Ditmyer
*Attorney, Agent, or Firm*—Sughrue, Mion, Zinn, Macpeak & Seas

[57] ABSTRACT

One of cassette shell halves has a cylindrical body protruding toward the other cassette shell half. The cylindrical body has a rivet press-fit hole and is constituted of elastic engagement pieces. The other cassette shell half has an opening for rivet insertion formed in an outer surface, and an engagement piece receiving hole, which communicates from the opening for rivet insertion to the inner surface of the other cassette shell half and has a tapered inner wall surface having the diameter increasing from an end, that stands facing the one cassette shell half, toward the opening for rivet insertion. When the elastic engagement pieces have been inserted into the engagement piece receiving hole, the elastic engagement pieces are brought into pressure contact with the tapered surface of the engagement piece receiving hole by a rivet, which is press-fitted through the opening for rivet insertion and into the rivet press-fit hole, and the cassette shell halves are thus temporarily assembled to each other.

4 Claims, 6 Drawing Sheets

MAGNETIC DISK CARTRIDGE

BACKGROUND OF THE INVENTION

1. Field of the Invention

This invention relates to a magnetic disk cartridge. This invention particularly relates to an improvement in a temporary assembly structure of a pair of cassette shell halves in a magnetic disk cartridge comprising a cassette shell, which is constituted of the cassette shell halves joined to each other, and a magnetic disk incorporated in the cassette shell such that it can rotate.

2. Description of the Prior Art

Magnetic disk cartridges comprise a thin type of cassette shell and a magnetic disk, which is incorporated in the cassette shell such that it can rotate and on which analog or digital signals are to be recorded magnetically. The cassette shell takes on the form of a flat prismatic shape and comprises a rectangular top surface having an area slightly larger than the area of the magnetic disk, a bottom surface having an opening, through which a center core for supporting the center of the magnetic disk is exposed to the exterior, and a side surface having a narrow width and extending between the periphery of the top surface and the periphery of the bottom surface. The magnetic disk cartridge is provided with an opening for insertion of a magnetic head, through which the magnetic head for magnetically recording and reproducing signals is to be inserted from the exterior such that the magnetic head can be brought into contact with the surfaces of the magnetic disk or can be brought to positions close to the surfaces of the magnetic disk. Also, the magnetic disk cartridge is provided with a shutter for opening and closing the opening for insertion of the magnetic head. When the magnetic disk cartridge is not used, the shutter closes the opening for insertion of the magnetic head such that dust, debris, or the like, may not enter into the magnetic disk cartridge. Liners constituted of nonwoven fabrics, or the like, are applied to the inner surfaces of the cassette shell, which stand facing the magnetic disk. When the magnetic disk is rotated, the liners serve to prevent the surfaces of the magnetic disk from being scratched and to remove dust, debris, or the like, from the surfaces of the magnetic disk.

In conventional magnetic disk cartridges, there is a sufficient spacing in the cassette shell along the thickness direction of the magnetic disk accommodated therein. Each of the liners is pushed up from the inner surface of the cassette shell by a weak leaf spring-like lifter. The liner is thereby urged toward the magnetic disk and kept in sufficient contact with the magnetic disk. Therefore, a slight allowance is tolerated for the dimensional accuracy in the thickness direction within the cassette shell.

Recently, a magnetic disk cartridge, which has a recording capacity 50 times as large as the recording capacity of the conventional magnetic disk cartridge (3.5-inch floppy disk) by virtue of a new high-density recording system, has been developed. In the developed magnetic disk cartridge, the magnetic disk is rotated at a markedly higher speed than the speed, at which the magnetic disk in the conventional magnetic disk cartridges is rotated. Also, when signals are recorded on the magnetic disk accommodated in the developed magnetic disk cartridge and are reproduced therefrom, the position of the magnetic disk must be adjusted with a very high accuracy with respect to a magnetic head.

A quality inspection is carried out in a final process of the operation for assembling a magnetic disk cartridge, and products having defects are removed as defective products. Defects encountered with magnetic disk cartridges include various kinds of defects. Since cassette shell halves are molded at a high accuracy and require a high manufacturing cost, in cases where a magnetic disk cartridge is regarded as a defective one due to defects of the magnetic disk incorporated therein, the cassette shell halves constituting the cassette shell of the magnetic disk cartridge should preferably be capable of being reused.

A magnetic disk cartridge comprises a cassette shell, which is constituted of a pair of cassette shell halves joined to each other, and a magnetic disk incorporated in the cassette shell such that it can rotate. Therefore, in the final process of the assembly operation, before the cassette shell halves, between which the magnetic disk has been interposed, are joined to each other by ultrasonic welding, or the like, a quality inspection should be carried out. In cases where defects are found for the magnetic disk, it should be exchanged with a new one. In this manner, the cassette shell halves can be reused.

Therefore, a structure of a magnetic disk cartridge is desired wherein, in the final process of the operation for assembling the magnetic disk cartridge, the cassette shell halves, between which the magnetic disk has been incorporated, can be temporarily fixed to each other, a quality inspection can be carried out before the cassette shell halves are joined to each other, and the cassette shell halves can be easily separated from each other in cases where a defect of the magnetic disk is found.

As the temporary assembly structures of audio and video cassettes, the structures for securing with screws have heretofore been employed. However, with thestructures for securing with screws, an internal thread for receiving an external thread becomes collapsed during repeated operations for securing with screws. Therefore, the internal thread can be reused only a limited number of times. Also, the operation for turning the screws with a screw driver must be carried out in order to engage and disengage the screws, and therefore the efficiency of the process cannot be kept high.

Therefore, a method for temporarily assembling cassette shell halves to each other has bee proposed, in which one of the cassette shell halves is provided with an engagement hole, and the other cassette shell half is provided with an engagement protrusion for fitting into and engaging with the engagement hole. However, with the proposed method, a slight clearance is set between the engagement hole and the engagement protrusion, and the cassette shell having been assembled temporarily undergoes a rattling motion. It has been found that it is difficult to rotate the magnetic disk quickly in such a rattling state, and quality inspection cannot be carried out satisfactorily.

SUMMARY OF THE INVENTION

The primary object of the present invention is to provide a magnetic disk cartridge provided with a temporary assembly structure wherein, after a magnetic disk has been incorporated between upper and lower cassette shell halve ina final process of assembly, the upper and lower cassette shell halves are capable of being temporarily assembled to each other such that they may not undergo a rattling motion, and wherein the upper and lower cassette shell halves are capable of being easily separated from each other in cases where a defect of the magnetic disk is found.

Another object of the present invention is to provide a magnetic disk cartridge provided with a temporary assembly structure wherein, upper and lower cassette shell halves are capable of being reused many times in the operations for assembling them to each other and separating them from each other.

The present invention provides a magnetic disk cartridge comprising a cassette shell, which is constituted of a pair of cassette shell halves joined to each other, and a magnetic disk incorporated in the cassette shell such that the magnetic disk can rotate, wherein:

the pair of the cassette shell halves are provided with contact surfaces on their inner surfaces, which contact surfaces come into contact with each other when the cassette shell halves are temporarily assembled to each other, one of the cassette shell halves (i.e., a cassette shell half located on the side opposite to a rivet insertion side) is provided with a cylindrical body, which protrudes from the one cassette shell half toward the othercassette shell half (i.e., toward a cassette shell half located on the rivet insertion side), the cylindrical body having a rivet press-fit hole constituted of a through hole, into which a temporary securing rivet is to be press-fitted, the cylindrical body being constituted of a plurality of elastic engagement pieces divided from one another by a plurality of slits, which are formed in the wall of the cylindrical body and extend along the axial direction of the cylindrical body, the other cassette shell half is provided with an opening for rivet insertion, which opens to an outer surface of the other cassette shell half, and an engagement piece receiving hole, which receives the elastic engagement pieces, the engagement piece receiving hole communicating from the opening for rivet insertion to the inner surface of the other cassette shell half, an inner wall surface of the engagement piece receiving hole forming a tapered surface, the diameter of which is increased from an end, that stands facing the one cassette shell half, toward the opening for rivet insertion, and in a state in which the elastic engagement pieces have been inserted into the engagement piece receiving hole and the contact surfaces of the pair of the cassette shell halves have been brought into contact with each other, the elastic engagement pieces are brought into pressure contact with and engaged with the tapered surface of the engagement piece receiving hole by the temporary securing rivet, which is press-fitted through the opening for rivet insertion and into the rivet press-fit hole, whereby the pair of the cassette shell halves are temporarily assembled to each other.

The magnetic disk cartridge in accordance with the present invention should preferably be constituted such that the cylindrical body, which is provided on the one cassette shell half and constitutes the elastic engagement pieces, may protrude from the contact surface of the one cassette shell half, and the engagement piece receiving hole of the other cassette shell half may open to the contact surface of the other cassette shell half.

Also, the magnetic disk cartridge in accordance with the present invention should preferably be constituted such that an increased-diameter portion (such as a tapered portion or a counter-bore portion) may be formed at an opening region of the rivet press-fit hole of the one cassette shell half, which opening region opens to an outer surface of the one cassette shell half, the increased-diameter portion serving to accommodate therein an end of the rivet, the diameter of which end is increased (or which end is collapsed)(by a staking process, or the like) during a final assembly operation, and a counter-bore surface may be formed in the opening for rivet insertion of the other cassette shell half, the counter-bore surface engaging with a flange of the rivet.

With the magnetic disk cartridge in accordance with the present invention, the pair of the upper and lower cassette shell halves are provided with the contact surfaces, which come into contact with each other when the cassette shell halves are temporarily assembled to each other. One of the cassette shell halves, which is located on the side opposite to the rivet insertion side, is provided with the elastic engagement pieces and the rivet press-fit hole, which is defined by the circumferential wall constituted of the elastic engagement pieces. The other cassette shell half, which is located on the rivet insertion side, is provided with the opening for rivet insertion and the engagement piece receiving hole. The inner wall surface of the engagement piece receiving hole forms the tapered surface, the diameter of which is increased from the end, that stands facing the one cassette shell half, toward the opening for rivet insertion. In the state in which the elastic engagement pieces have been inserted into the engagement piece receiving hole and the contact surfaces of the pair of the cassette shell halves have been brought into contact with each other, the rivet is press-fitted through the opening for rivet insertion and into the rivet press-fit hole. As a result, the elastic engagement pieces are brought into pressure contact with and engaged with the tapered surface of the engagement piece receiving hole by the rivet. In this manner, the pair of the cassette shell halves can be temporarily assembled to each other such that the accuracy, with which the thickness of the assembled cassette shell is adjusted, may be kept high.

Also, in the state in which the pair of the cassette shell halves have been temporarily assembled to each other, the rivet is firmly held in the rivet press-fit hole by the frictional force, which acts between the outer circumferential surface of the stem of the rivet and the inner wall surface of the rivet press-fit hole. Therefore, the cassette shell undergoes no rattling motion. Further, in this state, there is no risk that the rivet comes off the rivet press-fit hole, and therefore the cassette shell halves do not easily become disengaged from each other. However, when the rivet is removed from the rivet press-fit hole by giving an axial impact thereto from the end of the rivet with an appropriate jig and the elastic engagement pieces are thereby released from the pushing force of the rivet, the elastic engagement pieces can return to their original state by their elasticity and can be pulled out of the engagement piece receiving hole. Therefore, the cassette shell halves can be easily separated from each other. Accordingly, in cases where a defect of the magnetic disk, or the like, is found in a quality inspection of the magnetic disk cartridge carried out in the state in which the cassette shell halves have been temporarily assembled to each other, the cassette shell halves can be separated from each other, and the defective magnetic disk can thereby be taken out from the magnetic disk cartridge. In this manner, the cassette shell halves can then be used again.

In cases where the magnetic disk cartridge is found to be non-defective as a result of the quality inspection of the magnetic disk cartridge carried out in the state in which the cassette shell halves have been temporarily assembled to each other, the cassette shell halves can then be finally assembled to each other simply by collapsing the end of the stem of the rivet with a staking process or by welding the rivet. Therefore, the final assembly operation can be carried out very easily.

As described above, the increased-diameter portion, such as a tapered portion or a counter-bore portion, may be formed at the opening region of the rivet press-fit hole of the one cassette shell half, which opening region opens to the outer surface of the one cassette shell half. The increased-diameter portion serves to accommodate therein the end of the rivet, the diameter of which end is increased (or which end is collapsed) by a staking process, or the like, during the final assembly operation. Also, the counter-bore surface may be formed in the opening for rivet insertion of the other cassette shell half, the counter-bore surface engaging with the flange of the rivet. In such cases, the flange and the end of the rivet can be prevented from protruding from the outer surfaces of the cassette shell.

DESCRIPTION OF THE PREFERRED EMBODIMENTS

The present invention will hereinbelow be described in further detail with reference to the accompanying drawings.

Figure 1:
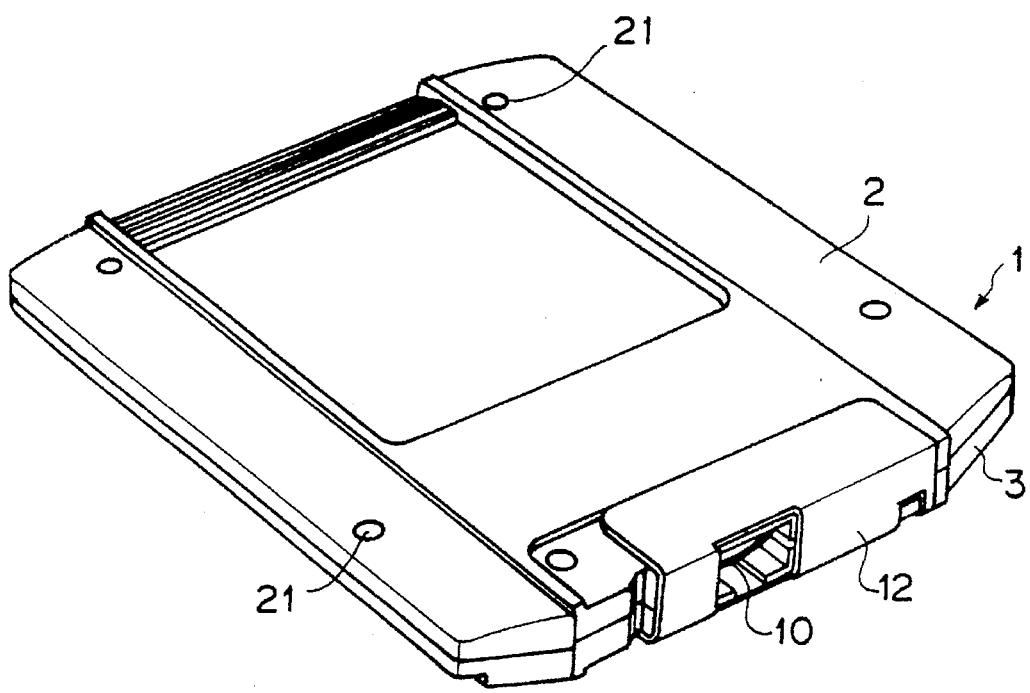
FIG. 1 is a perspective view showing an example of the magnetic disk cartridge in accordance with the present invention, the view being taken from above.
Figure 2:
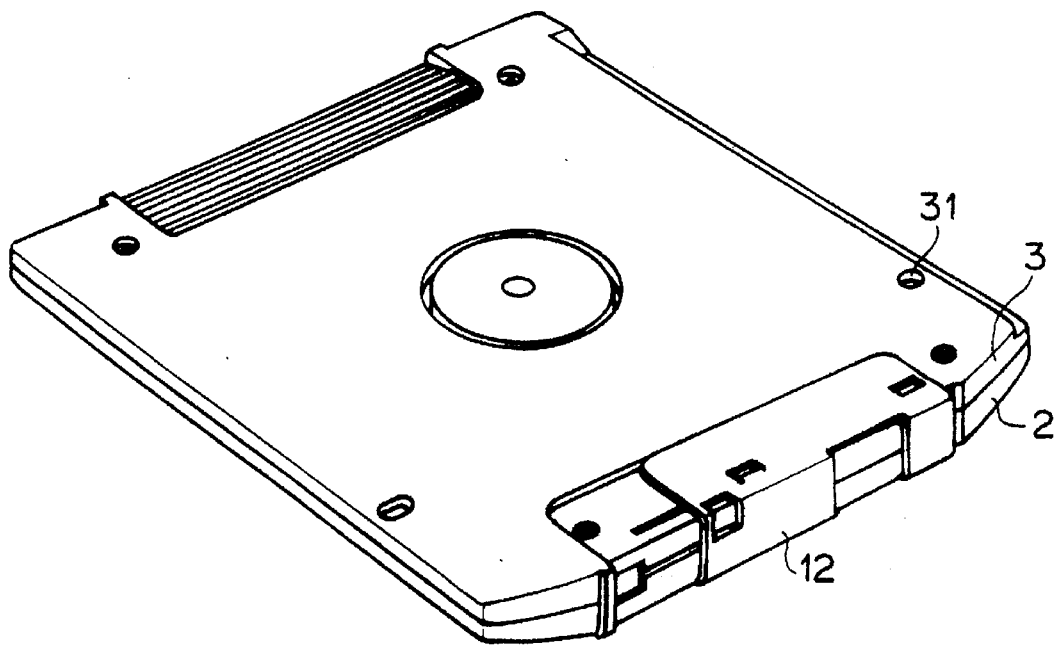
FIG. 2 is a perspective view showing the example of the magnetic disk cartridge in accordance with the present invention, the view being taken from below.

FIG. 1 is a perspective view showing an example of the magnetic disk cartridge in accordance with the present invention, the view being taken from above. FIG. 2 is a perspective view showing the example of the magnetic disk cartridge in accordance with the present invention, the view being taken from below. As illustrated in FIG. 1, the magnetic disk cartridge in accordance with the present invention comprises a cassette shell 1, which is constituted of a pair of an upper cassette shell half 2 and a lower cassette shell half 3 joined to each other, and a magnetic disk incorporated in the cassette shell 1 such that the magnetic disk can rotate. A opening 10 for insertion of a magnetic head is formed in a side surface of the cassette shell 1. A shutter 12 is located for a sliding movement and is urged to the closing position such that it can open and close the opening 10 for insertion of the magnetic head. In FIG. 1, the shutter 12 is located at the open position. In FIG. 2, the shutter 12 is located at the closed position.

Figure 3A:
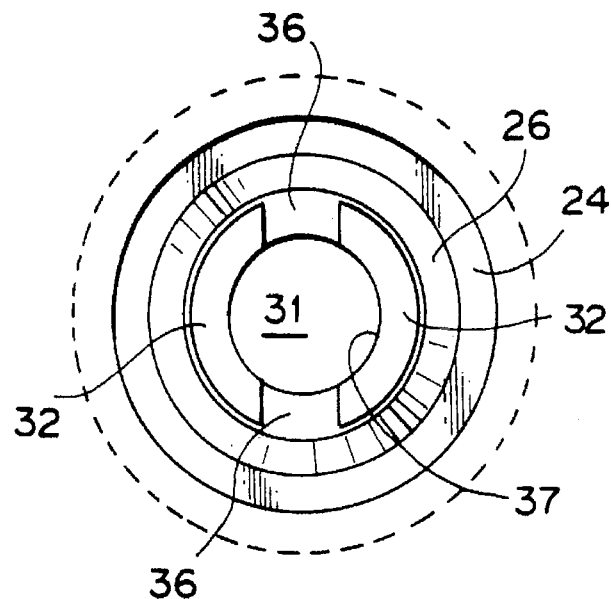
FIG. 3A is an enlarged plan view showing an area of the securing with a rivet in an embodiment of the magnetic disk cartridge in accordance with the present invention, wherein upper and lower cassette shell halves are located one above the other such that the center of a rivet press-fit hole of the lower cassette shell half and the center of an engagement piece receiving hole of the upper cassette shell half may be aligned with each other.
Figure 3B:
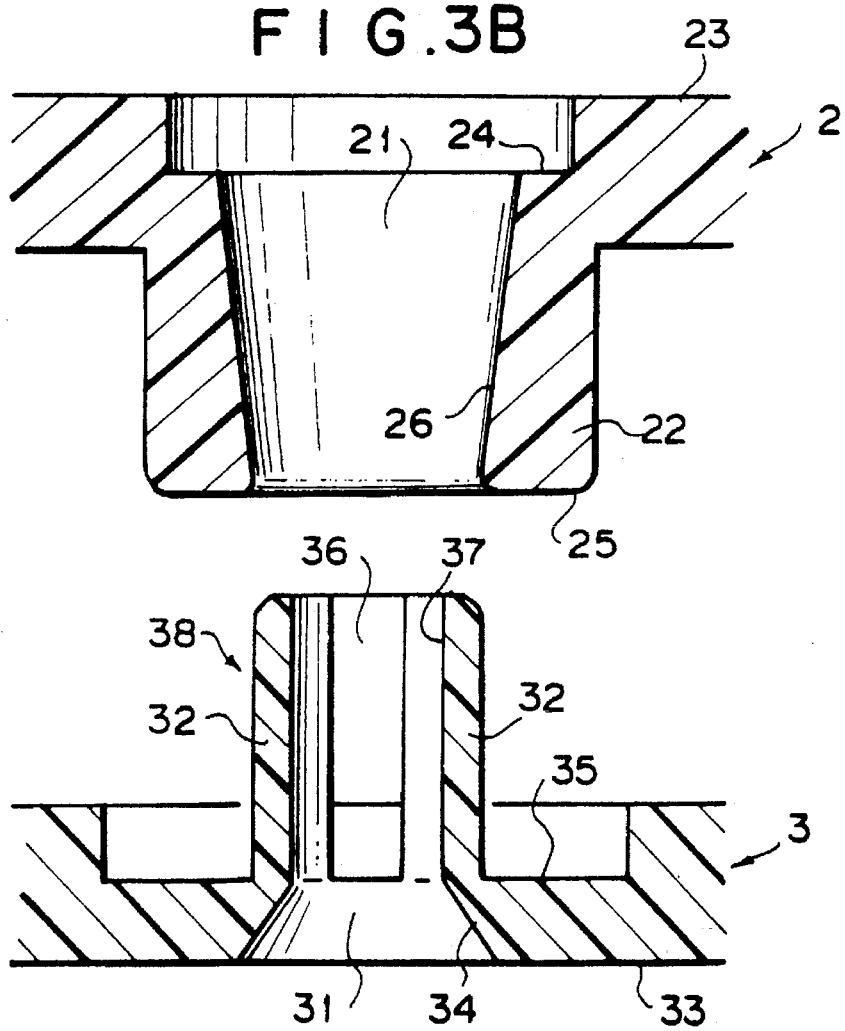
FIG. 3B is a sectional view showing the area of the securing with a rivet in the embodiment of the magnetic disk cartridge in accordance with the present invention, wherein the upper and lower cassette shell halves are located one above the other such that the center of the rivet press-fit hole of the lower cassette shell half and the center of the engagement piece receiving hole of the upper cassette shell half may be aligned with each other.
Figure 4:
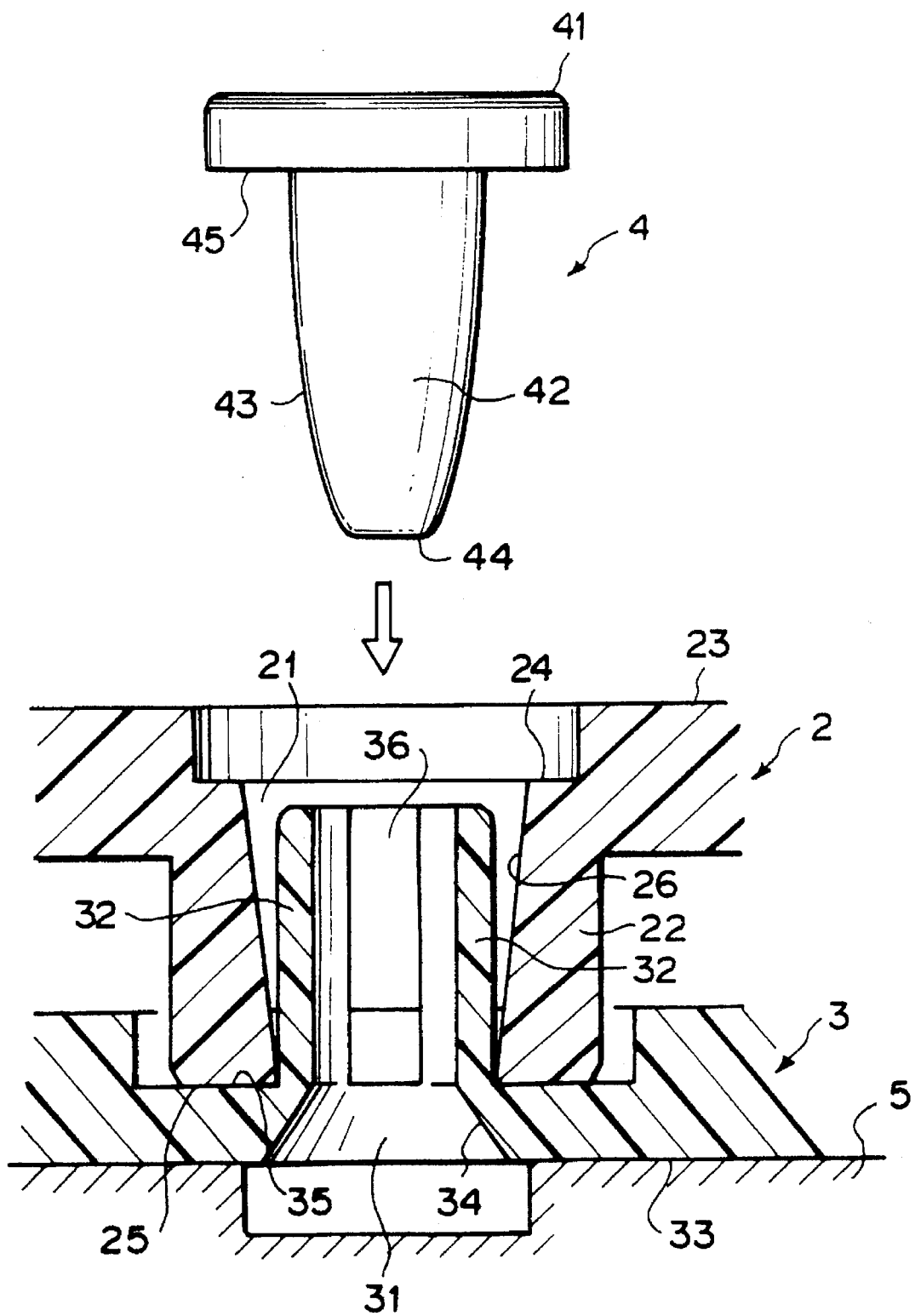
FIG. 4 is a sectional view showing the embodiment of the magnetic disk cartridge in accordance with the present invention before the upper and lower cassette shell halves are temporarily secured to each other by a temporary securing rivet.
Figure 5:
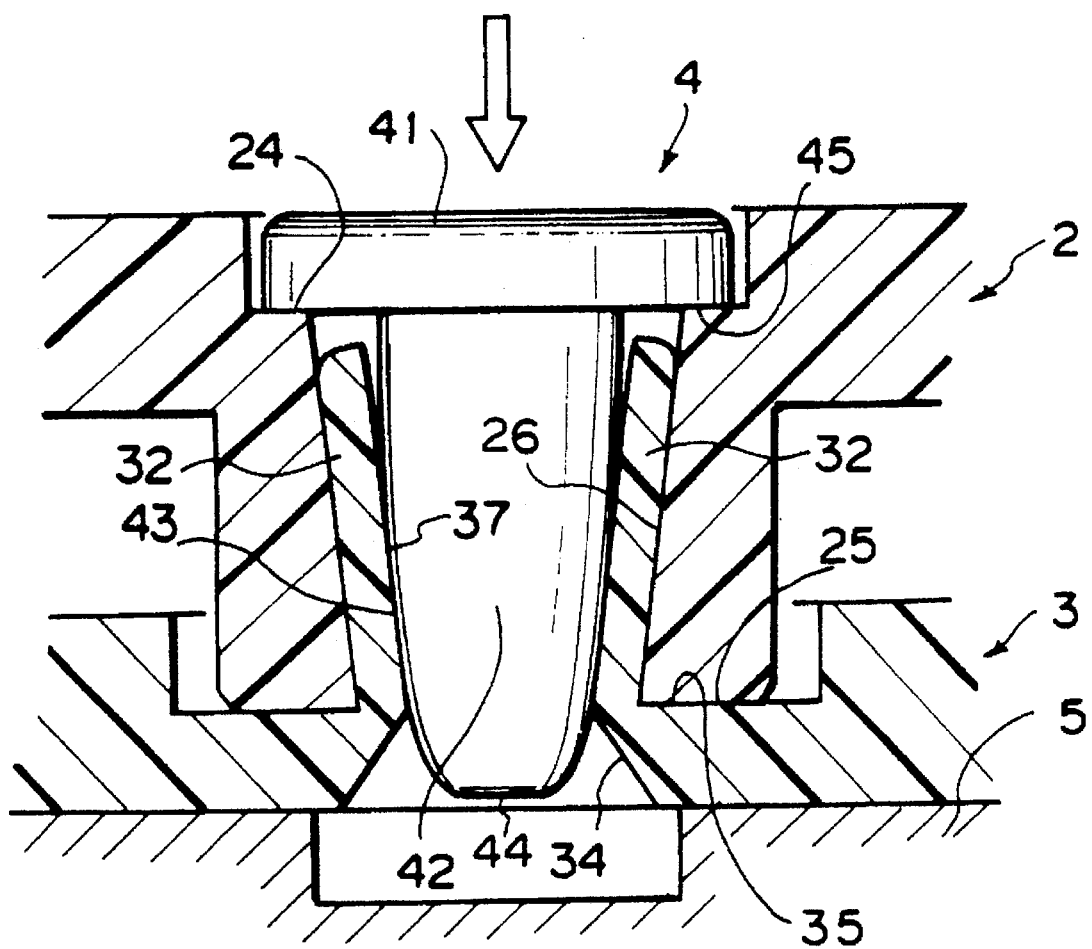
FIG. 5 is a sectional view showing the embodiment of the magnetic disk cartridge in accordance with the present invention after the upper and lower cassette shell halves have been temporarily secured to each other by the temporary securing rivet.

FIG. 3A is an enlarged plan view showing an area of the securing with a rivet in an embodiment of the magnetic disk cartridge in accordance with the present invention, wherein upper and lower cassette shell halves are located one above the other such that the center of a rivet press-fit hole of the lower cassette shell half and the center of an engagement piece receiving hole of the upper cassette shell half may be aligned with each other. FIG. 3B is a sectional view showing the area of the securing with a rivet in the embodiment of the magnetic disk cartridge in accordance with the present invention. FIG. 4 is a sectional view showing the embodiment of the magnetic disk cartridge in accordance with the present invention before the upper and lower cassette shell halves are temporarily assembled (i.e., temporarily secured) to each other by a temporary securing rivet. FIG. 5 is a sectional view showing the embodiment of the magnetic disk cartridge in accordance with the present invention after the upper and lower cassette shell halves have been temporarily assembled to each other by the temporary securing rivet.

The pair of the. upper cassette shell half 2 and the lower cassette shell half 3 are constituted of a hard resin, such as a high-impact polystyrene resin or an ABS resin. The upper cassette shell half 2 is provided with a opening for insertion of a temporary securing rivet 4, which opening is formed in an upper surface 23 of the upper cassette shell half 2. The upper cassette shell half 2 is also provided with an engagement piece receiving hole 21, which receives elastic engagement pieces 32, 32 of the lower cassette shell half 3. The engagement piece receiving hole 21 communicates from the opening for rivet insertion to the inner surface of the upper cassette shell half 2. The engagement piece receiving hole 21 is formed coaxially with a cylindrical body (boss) 22, which is formed integrally with the upper cassette shell half 2 and protrudes from the inner surface of the upper cassette shell half 2. The engagement piece receiving hole 21 opens to a flat contact surface 25, which is formed at the lower end of the cylindrical body 22 and comes into contact with a contact surface 35 of the lower cassette shell half 3.

The opening for rivet insertion is provided with an annular counter-bore surface 24, which is formed at a predetermined distance from and below the upper surface 23 of the upper cassette shell half 2. The counter-bore surface 24 engages with a bottom surface 45 of a flange 41 of the temporary securing rivet 4. As illustrated in FIG. 5, in the state in which the flange 41 of the temporary securing rivet 4 is supported on the counter-bore surface 24, the top surface of the flange 41 does not protrude from the upper surface 23 of the upper cassette shell half 2. Also, the inner wall surface of the engagement piece receiving hole 21 forms a tapered surface 26, the diameter of which is increased from the contact surface 25 toward the opening for rivet insertion.

The lower cassette shell half 3 is provided with a cylindrical body 38, which is formed integrally with the lower cassette shell half 3 and protrudes from the contact surface 35, that comes into contact with the contact surface 25 of the cylindrical body 22 of the upper cassette shell half 2, toward the upper cassette shell half 2. The cylindrical body 38 is provided with a rivet press-fit hole 31, which is formed coaxially with the cylindrical body 38. The rivet press-fit hole 31 communicates from a lower surface 33 of the lower cassette shell half 3 to the inner surface of the lower cassette shell half 3. The outer diameter of the cylindrical body 38 is slightly smaller than the inner diameter of the opening of the engagement piece receiving hole 21 of the upper cassette shell half 2, which opening opens to the contact surface 25. The cylindrical body 38 can thus be inserted into the engagement piece receiving hole 21. The cylindrical body 38 is divided into two pieces by a pair of slits 36, 36, which extend along the axial direction of the cylindrical body 38 from the upper end of the cylindrical body 38 to the base portion of the cylindrical body 38. In this manner, the cylindrical body 38 constitutes a pair of elastic engagement pieces 32, 32. (Alternatively, the cylindrical body 38 may be divided into four pieces by two pairs of such slits and may thereby constitute two pairs of such elastic engagement pieces.) Also, the lower end of the rivet press-fit hole 31 constitutes a tapered hole 34, which flares downwardly and opens to the lower surface 33 of the lower cassette shell half 3.

As illustrated in FIG. 4, when the upper cassette shell half 2 and the lower cassette shell half 3 are to be temporarily assembled to each other, the lower cassette shell half 3 is placed on a temporary assembly base 5, and the upper cassette shell half 2 is fitted to the lower cassette shell half 3. In this state, the elastic engagement pieces 32, 32 of the lower cassette shell half 3 is inserted into the engagement piece receiving hole 21 of the cylindrical body 22 of the upper cassette shell half 2, and the contact surface 25 of the upper cassette shell half 2 and the contact surface 35 of the lower cassette shell half 3 are brought into contact with each other. Also, the center of the engagement piece receiving hole 21 and the center of the rivet press-fit hole 31 are aligned with each other. Further, in this state, the upper ends of the elastic engagement pieces 32, 32 are located at a level lower than the level of the counter-bore surface 24 of the upper cassette shell half 2.

The temporary securing rivet 4 is constituted of a thermoplastic resin. The temporary securing rivet 4 is provided with a flange 41 at a base end (at an upper end in FIG. 4). The flange 41 has the flat bottom surface 45 and a stem 42, which continues into the flange 41. The outer diameter of the base end of the stem 42 is larger than the inner diameter of the rivet press-fit hole 31, which is defined by the elastic engagement pieces 32, 32 of the lower cassette shell half 3, i.e. the inner diameter of an inner circumferential wall surface 37 of the elastic engagement pieces 32, 32. Also, the outer diameter of an outer circumferential wall surface 43 of the stem 42 is reduced downwardly from the base end of the stem 42 along a gentle, outwardly convex curve. The lower end of the stem 42 constitutes a flat surface 44.

During the temporary assembly operation, the temporary securing rivet 4 is inserted into the opening for rivet insertion of the upper cassette shell half 2 from above. The stem 42 of the temporary securing rivet 4 is thus inserted into the rivet press-fit hole 31 of the lower cassette shell half 3. As a result, the elastic engagement pieces 32, 32 is pushed and opened by the stem 42 against their elastic force. As illustrated in FIG. 5, in the state in which the bottom surface 45 of the flange 41 of the temporary securing rivet 4 is in contact with the counter-bore surface 24 of the upper cassette shell half 2, the outer wall surfaces of the elastic engagement pieces 32, 32 are brought into pressure contact with the tapered surface 26 of the upper cassette shell half 2, and the upper cassette shell half 2 and the lower cassette shell half 3 are thereby engaged with each other. Also, the temporary securing rivet 4 is held at the position shown in FIG. 5 by the frictional force, which acts between the outer circumferential wall surface 43 of the temporary securing rivet 4 and the inner circumferential wall surface 37 of the elastic engagement pieces 32, 32. In this manner, the upper cassette shell half 2 and the lower cassette shell half 3 can be temporarily assembled to each other such that the accuracy, with which the thickness of the assembled cassette shell 1 is adjusted, may be kept high.

As described above, the inner wall surface of the engagement piece receiving hole 21 constitutes the tapered surface 26, the diameter of which is increased upwardly in FIG. 5. Therefore, even if force is applied in a direction that separates the upper cassette shell half 2 and the lower cassette shell half 3 from each other, the engagement state of the upper cassette shell half 2 and the lower cassette shell half 3 can be kept firmly. In this state, the end of the stem 42 of the temporary securing rivet 4 protrudes into the tapered hole 34. However, in order to enable a quality inspection in the state of temporary assembly (which is carried out by loading the magnetic disk cartridge in a disk drive unit), the length of the stem 42 is set such that the flat surface 44 at the lower end of the stem 42 may not protrude outwardly from the lower surface 33 of the lower cassette shell half 3.

Figure 6:
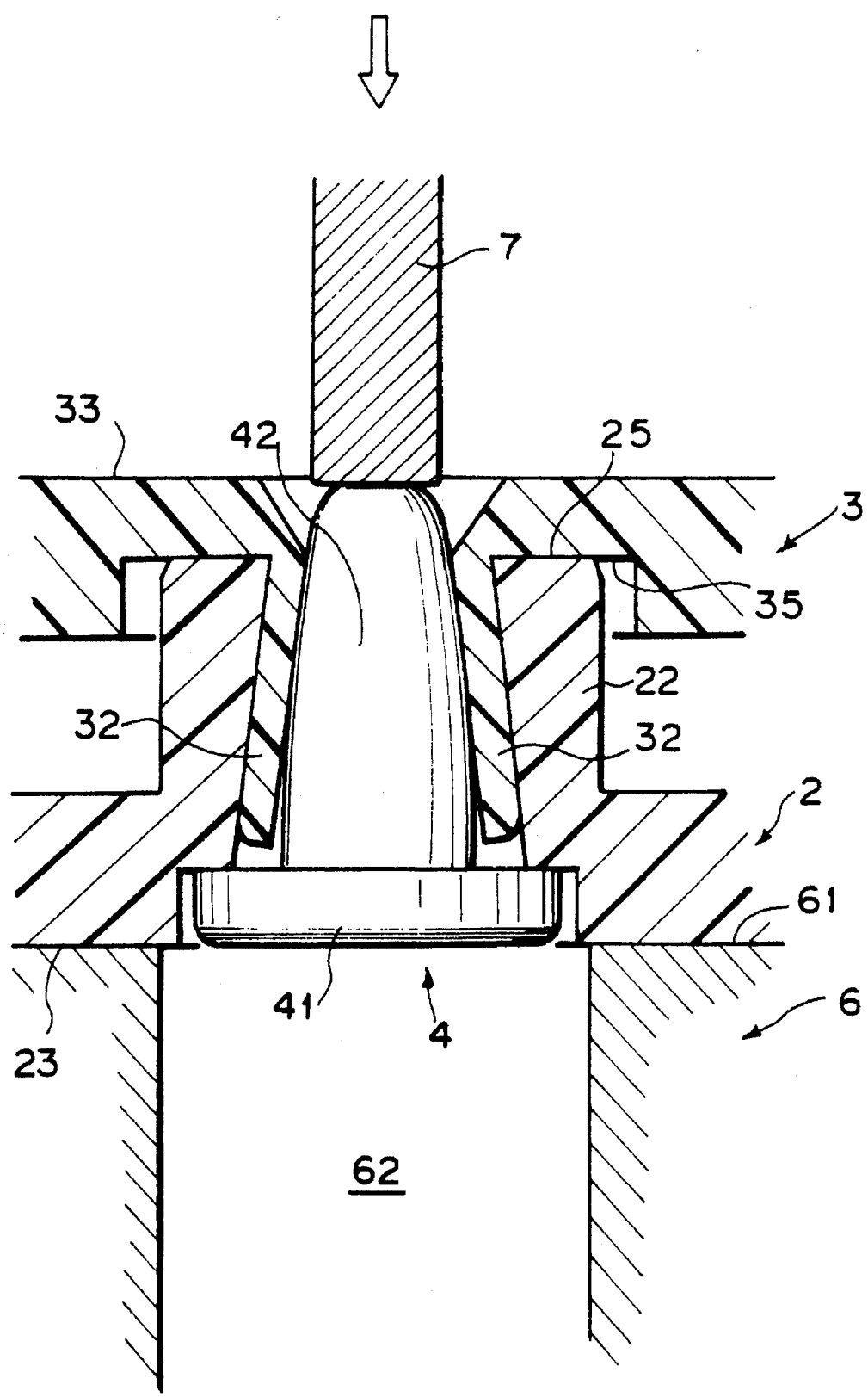
FIG. 6 is a sectional view showing how the upper and lower cassette shell halves in the embodiment of the magnetic disk cartridge in accordance with the present invention, which have been temporarily secured to each other, are separated from each other.

As illustrated in FIG. 6, in cases where the magnetic disk is found to be defective in the quality inspection of the temporarily assembled magnetic disk cartridge and is to be replaced with new one, the upper cassette shell half 2 and the lower cassette shell half 3 having been temporarily assembled to each other are turned upside down and placed on a base 6. The base 6 is provided with a support surface 61, which supports the upper surface 23 of the upper cassette shell half 2, the surface being now located on the lower side, and a rivet receiving pit 62, which has a diameter larger than the outer diameter of the flange 41 of the temporary securing rivet 4. The center of the flange 41 of the temporary securing rivet 4 and the center of the rivet receiving pit 62 are aligned with each other. In this state, a flat lower end surface of a jig 7, which has an outer diameter smaller than the inner diameter of the minimum inner-diameter portion of the rivet press-fit hole 31, is set on the flat surface 44 at the end of the temporary securing rivet 4, and downward impact force is given to the jig 7. In this manner, the temporary securing rivet 4 can be easily removed downwardly. As a result, the elastic engagement pieces 32, 32 return to their state shown in FIG. 4 by their elasticity, and the engagement state of the upper cassette shell half 2 and the lower cassette shell half 3 is released. Therefore, the upper cassette shell half 2 and the lower cassette shell half 3 can be separated from each other, and the magnetic disk can be taken out of the cassette shell 1. The upper cassette shell half 2 and the lower cassette shell half 3 can then be used again.

Figure 7:
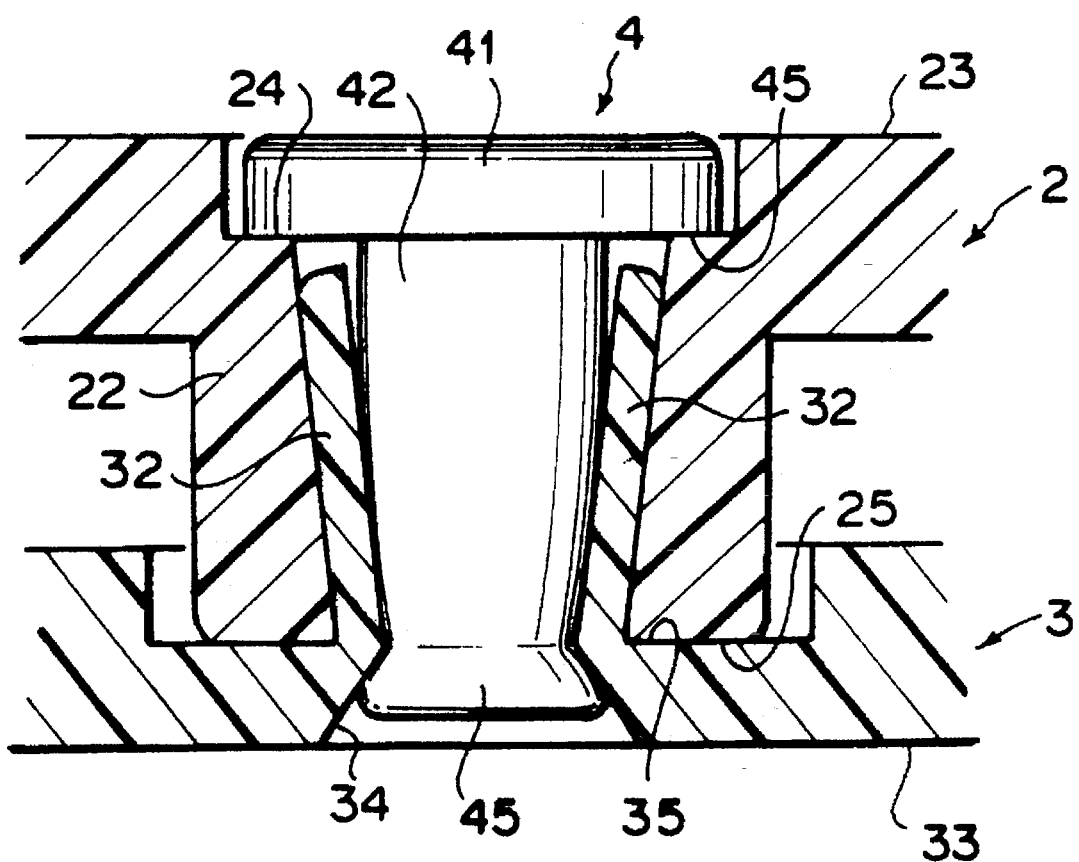
FIG. 7 is a sectional view showing a finished state of the embodiment of the magnetic disk cartridge in accordance with the present invention.

In cases where the magnetic disk is found to be non-defective in the quality inspection of the temporarily assembled magnetic disk cartridge, a final assembly operation is carried out on the magnetic disk cartridge. In the final assembly operation, the upper cassette shell half 2 and the lower cassette shell half 3 having been temporarily assembled to each other are turned upside down and placed on a final assembly base (not shown). The top surface of the flange 41 of the temporary securing rivet 4 is supported on the final assembly base, and the end of the stem 42 of the temporary securing rivet 4, which end protrudes into the tapered hole 34, is collapsed by an appropriate jig, i.e. the temporary securing rivet 4 is staked with an ordinary staking method. In this manner, as illustrated in FIG. 7, a collapsed end portion 45 of the stem 42 of the temporary securing rivet 4 spreads in the tapered hole 34, and the temporary securing rivet 4 is thereby staked. Therefore, the upper cassette shell half 2 and the lower cassette shell half 3 are firmly secured to each other such that they cannot be disassembled from each other.

Alternatively, the end of the stem 42 of the temporary securing rivet 4 may be molten with heat in the tapered hole 34, and the temporary securing rivet 4 may thereby be secured to the tapered hole 34. As another alternative, the end of the stem 42 of the temporary securing rivet 4 may be welded to the tapered hole 34 by an ultrasonic welding process. In lieu of the tapered hole 34, a counter-bore hole may be formed.

What is claimed is:

1. A magnetic disk cartridge comprising a cassette shell, which is constituted of a pair of cassette shell halves joined to each other, and a magnetic disk incorporated in the cassette shell such that the magnetic disk can rotate, wherein:

the pair of the cassette shell halves are provided with contact surfaces on their inner surfaces, which contact surfaces come into contact with each other when the cassette shell halves are temporarily assembled to each other, one of the cassette shell halves is provided with a cylindrical body, which protrudes from said one cassette shell half toward the other cassette shell half, said cylindrical body having a rivet press-fit hole constituted of a through hole, into which a temporary securing rivet is to be press-fitted, said cylindrical body being constituted of a plurality of elastic engagement pieces divided from one another by a plurality of slits, which are formed in the wall of said cylindrical body and extend along the axial direction of said cylindrical body, said other cassette shell half is provided with an opening for rivet insertion, which opens to an outer surface of said other cassette shell half, and an engagement piece receiving hole, which receives said elastic engagement pieces, said engagement piece receiving hole communicating from said opening for rivet insertion to the inner surface of said other cassette shell half, an inner wall surface of said engagement piece receiving hole forming a tapered surface, the diameter of which is increased from an end, that stands facing said one cassette shell half, toward said opening for rivet insertion, and in a state in which said elastic engagement pieces have been inserted into said engagement piece receiving hole and said contact surfaces of the pair of the cassette shell halves have been brought into contact with each other, said elastic engagement pieces are brought into pressure contact with and engaged with said tapered surface of said engagement piece receiving hole by said temporary securing rivet, which is press-fitted through said opening for rivet insertion and into said rivet press-fit hole, whereby the pair of the cassette shell halves are temporarily assembled to each other.

2. A magnetic disk cartridge as defined in claim 1 wherein said cylindrical body, which is provided on said one cassette shell half and constitutes said elastic engagement pieces, protrudes from said contact surface of said one cassette shell half, and said engagement piece receiving hole of said other cassette shell half opens to said contact surface of said other cassette shell half.

3. A magnetic disk cartridge as defined in claim 2 wherein an increased-diameter portion is formed at an opening region of said rivet press-fit hole of said one cassette shell half, which opening region opens to an outer surface of said one cassette shell half, said increased-diameter portion serving to accommodate therein an end of said rivet, the diameter of which end is increased during a final assembly operation, and a counter-bore surface is formed in said opening for rivet insertion of said other cassette shell half, said counter-bore surface engaging with a flange of said rivet.

4. A magnetic disk cartridge as defined in claim 1 wherein an increased-diameter portion is formed at an opening region of said rivet press-fit hole of said one cassette shell half, which opening region opens to an outer surface of said one cassette shell half, said increased-diameter portion serving to accommodate therein an end of said rivet, the diameter of which end is increased during a final assembly operation, and a counter-bore surface is formed in said opening for rivet insertion of said other cassette shell half, said counter-bore surface engaging with a flange of said rivet.

* * * * *